(12) United States Patent
Hatfield

(10) Patent No.: US 8,396,752 B2
(45) Date of Patent: Mar. 12, 2013

(54) METHOD FOR MANAGING LISTING PRICES IN AN ECOMMERCE ENVIRONMENT

(75) Inventor: Ryan Daniel Hatfield, San Angelo, TX (US)

(73) Assignee: Ryan Hatfield, San Jose, CA (US)

( * ) Notice: Subject to any disclaimer, the term of this patent is extended or adjusted under 35 U.S.C. 154(b) by 41 days.

(21) Appl. No.: 12/952,131

(22) Filed: Nov. 22, 2010

(65) Prior Publication Data

US 2012/0130772 A1   May 24, 2012

(51) Int. Cl.
*G06Q 30/00* (2006.01)
(52) U.S. Cl. ...................... 705/26.1; 705/27.1
(58) Field of Classification Search .................. 705/26.1, 705/27.1
See application file for complete search history.

(56) References Cited

U.S. PATENT DOCUMENTS

2005/0071249 A1\* 3/2005 Nix et al. .................... 705/26
2009/0164383 A1\* 6/2009 Rothman .................... 705/80

OTHER PUBLICATIONS

Anonymous, "Worldspan Rapid Reprice(R) Select Makes Market Debut, Setting New Precedent as an All-in-One Low-Fare Shopping and Repricing Tool", Aug. 28, 2006, PR Newswire.\*

\* cited by examiner

*Primary Examiner* — Brandy A Zukanovich

(57) ABSTRACT

A computer-implemented method for managing listing prices in an ecommerce environment. The method includes receiving from a user information, including price information, pertaining to a user's listing on an ecommerce web site, receiving from the user at least one search term that is not a valid UPC, ISBN, EAN, eBay Product ID, or ASIN, searching the ecommerce web site using the search term(s) received from the user and retrieving from the ecommerce web site at least one item listing relevant to the search term(s), and using an algorithm that utilizes the price of the at least one item retrieved from the ecommerce web site to determine a new price for the user's listing.

4 Claims, 6 Drawing Sheets

FIG. 7

FIG. 8

METHOD FOR MANAGING LISTING PRICES IN AN ECOMMERCE ENVIRONMENT

RELATED APPLICATIONS

Not Applicable.

BACKGROUND OF THE INVENTION

The present invention relates generally to a computer-implemented method, and more specifically to a computer-implemented method for managing listing prices in an ecommerce environment.

Over the past decade or so, the growth of ecommerce sites has been phenomenal. Of such sites, eBay is by far the most successful. As of this writing, eBay has hundreds of millions of users worldwide, and has revenues exceeding seven and a half billion dollars. Of these users, many are sellers who use eBay as a means to supplement their income.

Given the vast number of users making purchases via ecommerce sites like eBay, sellers are constantly looking for methods of distinguishing themselves and their goods from those of other users, and for methods of increasing the total number of sales they are able to achieve on the ecommerce site. Books, audiovisual materials, and internet web sites are devoted to strategies for increasing sales on ecommerce sites, and specifically on eBay.

Typically, a user or seller lists an item on an ecommerce site, along with a price for the listed item. Should the user wish to reprice the item, it is often done manually. Repricing may be desired for a variety of reasons, including gaining or retaining a competitive advantage over other sellers who are selling the same item. Researching all identical or similar listings in order to determine the optimal price at any given time is inefficient, and for users with many listings on a given ecommerce site, may be time-prohibitive. Automated repricers are available for sites such as Amazon.com and Half.com, which are 100% catalog-based. Such repricers are also available for certain cataloged categories on eBay. Non-cataloged sites, however, and non-cataloged categories on eBay, do not have such automated repricers due to hurdles presented by the non-cataloged nature of the sites or categories and the requirements that non-cataloged items be compared by an automatic repricer.

What is needed, then, is an easy to use, automated method for sellers who wish to reprice items for sale on an ecommerce site according to chosen parameters and settings chosen by the seller.

SUMMARY OF THE INVENTION

The present invention provides a computer-implemented method for managing listing prices in an ecommerce environment. The method includes receiving from a user information, including price information, pertaining to a user's listing on an ecommerce web site, receiving from the user at least one search term that is not a valid UPC, ISBN, EAN, eBay Product ID, or ASIN, searching the ecommerce web site using the search term(s) received from the user and retrieving from the ecommerce web site at least one item listing relevant to the search term(s), and using an algorithm that utilizes the price of the at least one item retrieved from the ecommerce web site to determine a new price for the user's listing.

In another aspect of the present invention, the method includes the step of automatically repricing the user's listing to reflect the newly determined price.

In another aspect of the present invention, the method includes the step of providing to the user a price recommendation reflecting the newly determined price.

In another aspect of the invention the user's listing is repriced such that the price of the repriced listing ends in the greater of 0.99, 0.89, 0.79, 0.69, 0.59, 0.49, 0.39, 0.29, 0.19, or 0.09 while remaining lower than the lowest priced item retrieved from the ecommerce web site.

In still another aspect of the present invention, the user's listing is repriced such that the listing appears on a first page of related listings on the ecommerce web site.

Other aspects of the present invention include specific steps for arriving at the end price or listing result, above, as further described below.

BRIEF DESCRIPTION OF THE DRAWING FIGURES

FIG. 7 depicts an exemplary command structure for an import aspect of the present invention.

FIG. 8 depicts a sample input of four commands for an import aspect of the present invention.

DETAILED DESCRIPTION OF THE PREFERRED EMBODIMENTS

Definitions

Figure 1:
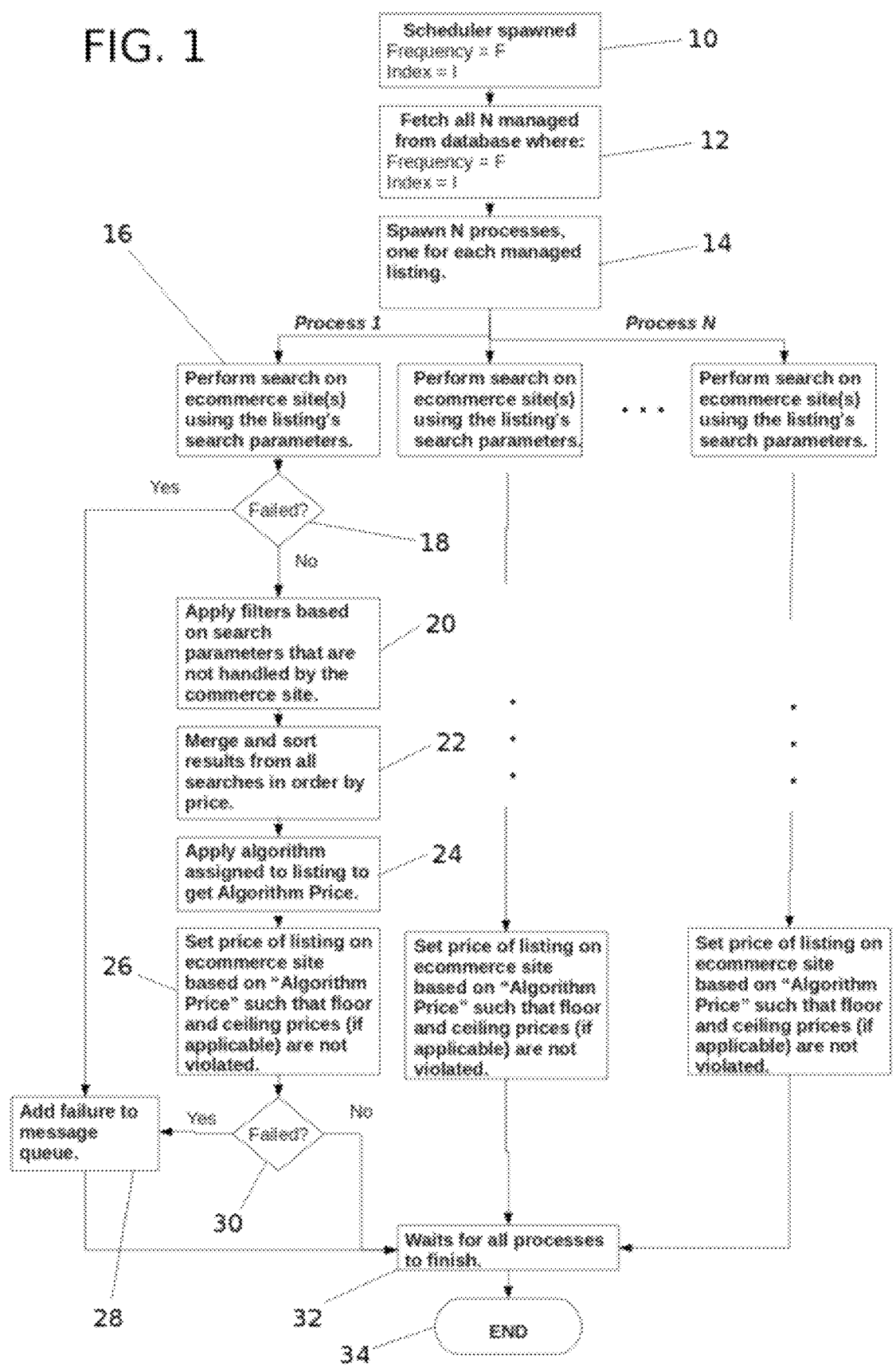
FIG. 1 is a flow chart depicting a scheduler aspect of the present invention.

The following definitions are provided for purposes of the present invention:

Algorithm—The term "algorithm" refers to a rule used in conjunction with the present method to control pricing behavior of a computer software implementation of the present method.

Algorithm Price—The term "algorithm price" refers to the price determined by a given algorithm used by the present method.

BIN Price—The term "BIN price" refers to the price of a listing as first retrieved by the computer software of the present invention. In general, this value represents a seller's initial price before being managed by the present method. It is the price that a listing may revert to when the listing becomes unmanaged or no competition is found.

Calculated Shipping—The term "calculated shipping" refers to the practice, by sellers on ecommerce web sites, to determine the shipping portion of shipping and handling charges. A seller can specify a flat handling fee, and the precise shipping fee is added based on the package dimensions, weight, origin, and destination. Thus, different buyers may be charged different shipping rates. The alternative to calculated shipping is flat rate shipping, which allows a seller to specify fixed shipping charges that are the same for all buyers.

Ceiling Price—The term "ceiling price" refers to an upper price limit, beyond which the present method will not set a higher price.

Fixed Price—The term "fixed price" refers to a fixed price listing on a third-party commerce web site, such as, for example, eBay. This is not an auction price.

Floor Price—The term "floor price" refers to a lower price limit, below which the present method with not set a lower price.

Managed Listing—The term "managed listing" refers to any listing that is being automatically managed by the present method, or any listing for which price recommendations are being generated by the present method.

PS or Price Spectre—The terms "PS" and "Price Spectre" are used herein to refer generally to a computer software implementation of the present method.

Relist—The term "relist" refers to a listing that is created by relisting and item for which a previous listing has ended.

Revenue or Profit—The terms "revenue" and "profit" are calculated by the present method by subtracting the floor price of an item from the actual sale price.

Search Console—The term "search console" refers to a screen that allows a user of the present computer-implemented method to specify their search parameters. This window also allows the user to perform searches based on those parameters.

The present computer-implemented method is directed to repricing (i.e. updating the price of) fixed price listings on third-party ecommerce sites on a regular basis. Among other functionalities described below, the present method allows a seller to identify non-cataloged competing products by specifying a keyword search, along with other search filters.

The present method may be implemented on at least one computer programmed to perform one or more of the steps described herein. In some implementations of the present method, more than one computer may be used, with each computer being programmed to carry out one or more steps of the present method. Such computer(s) may be general purpose computers, such as a desktop computer used by a seller wishing to manage the price of items listed on an ecommerce site. It is contemplated, however, that any suitable computer may be used with the present method, any suitable computer being any computer that is capable of being programmed to perform one or more steps of the present method. Such computers include, but are not limited to, desktop computers, laptop computers, netbooks, cellular phones, smart phones, PDAs, gaming systems, and the like. Further, the present method is not limited by the operating system used by any such computer, nor by the programming language used to program the computer to carry out one or more steps of the present method.

In general, the present method involves one or more computers used by a user of the present method, in communication with one or more computers being operated by an online auction web site. Communication between the two computers preferably occurs via the internet, but it is contemplated that such communication may occur in any suitable manner. Such computers may, for example, be in communication via a local-area network (LAN), wide-area network (WAN), virtual private network (VPN), cellular network, Bluetooth®, ethernet connection, USB connection, or any other suitable communication structure. The precise method of communication used between the various computers is not intended to be limiting, nor is the communication protocol used by the various computers. The present invention is limited only by the claims presented below, and not by exemplary hardware described herein.

Now provided is a detailed description of one implementation of the present method. As described below, the method is contemplated for use with the eBay, Amazon.com, and Half.com ecommerce sites, and the eBay and Amazon.com APIs are used to provide the present method's functionality with respect to managing listings on those sites. The following is exemplary, and it is contemplated that the functionality described herein and claimed below may be adapted for use with any suitable ecommerce site.

Now provided is a description of the various functionalities provided by the present invention, along with a description of the general use of the invention.

Front End

Initial Setup

When a user of the present method initially signs up for the service or downloads the software of the present method, the software (referred to herein as "Price Spectre" or "PS") downloads the user's current listings on a third-party site of choice (e.g. eBay). These listings are downloaded in the background, a process initiated by the addition of the "getSellerItems" instruction to the work queue. In addition, the user is prompted to set optional default search parameters, algorithm options, floor price, and ceiling price values. The user may decline to set the optional defaults.

Default search parameters can be set like those that exist in the search console, with the addition that the "include/exclude fixedprice listings" and "include/exclude Half.com listings" parameters can be set so that they always include, always exclude, or "inherit" the setting based on the format of the listing. For example, if a user chooses the inherit option for both settings, then a Half.com listing will be automatically adjusted so that the "include/exclude Half.com" search parameter for that listing is set to "include," while the "include/exclude fixedprice listings" search parameter for that listing is set to "exclude." If the same setting is applied to a fixedprice listing, then the Half.com search parameter for that listing is set to "exclude" and the fixedprice search parameter for that listing is set to "include." The user can then apply these new default parameters to all future listings, or have the new default parameters applied to all current listings by checking the appropriate checkbox.

"Algorithm options" allow the user to specify a default algorithm, along with any required inputs (X and/or Y) to the algorithm. The user can then apply these default algorithm options to all future listings, of have these default algorithm options applied to all current listings by checking the appropriate checkbox.

A user of the present method may also specify whether listings are repriced manually or automatically, by default.

A user of the present method may also set a default floor price by specifying a fixed amount regardless of listing price, a fixed discount less than the initial listing price, or a percentage discount less than the initial listing price. The user can then apply these parameters to all future listings or apply this default floor price to all current listings by checking the appropriate checkbox. If the default floor price is applied to all current listings, then the instruction "updatePriceAll" is added to the work queue and all listings are marked as "dirty" in the database to prevent multiple updates.

A user of the present method may also set a default ceiling price by specifying a fixed amount regardless of the listing price, a fixed premium greater than the initial listing price, or a percentage premium greater than the initial price of the listing. The user can then apply this to all future listings or having this default ceiling price applied to all current listings by checking the appropriate checkbox. If this setting is applied to all current listings, then the instruction "update- PriceAll" is added to the work queue and all listings are marked as dirty in the database to prevent multiple updates.

A user can also set default behaviors regarding how the present software method will behave under certain conditions. For example, choosing a "Relaxed Relist" will ensure that when a listing is first listed, Price Spectre will attempt to find the original listing, just as if "Relaxed Relist" were disabled. If the ecommerce site is eBay, for example, PS will check whether eBay explicitly declares that the listing is a relist of the original. If no original listing is found, the Price Spectre software will automatically assume the most recently ended listing with the same title and SKU is the original listing when determining whether the listing is a relist. The same principle applies to any suitable ecommerce web site. When the "Relaxed Relist" feature is disabled, then PS will only consider a listing relisted if the original listing on the third-party ecommerce site explicitly indicates that it is a relist.

When the "Ignore Shipping" feature of the present software method is enabled, PS will only consider a user's price against a competitor's price. By default, "Ignore Shipping" is preferably disabled, in which case PS considers the user's "Total Price" (price plus shipping and handling) and compares it to the competitor's total price.

A user may use the "Disable Tooltips" feature to disable the tooltips that explain the function of each setting used by the present method.

The "US Postal Code" setting allows a user to provide postal code information for determining shipping costs in instances where competitors are using calculated shipping. It is contemplated that this feature may be adapted for use with shipping destinations in countries other than the United States.

The "No Competitor Found" setting specifies the action taken by PS when no competing listings are found. Valid settings include, for example, BIN Price, Ceiling Price (if specified), Floor Price, or None (instructing the software to leave the price as-is).

Price Spectre may use any suitable setting or search parameter to identify matching competitor listings. This include, but are not limited to, required keywords or product codes, and optional filters like "minimum price," "maximum price," "minimum feedback rating," "maximum feedback rating," "minimum quantity," "maximum quantity," include only domestic listings, ignore duplicate listings, include/exclude fixedprice eBay listings, include/exclude eBay auctions that have a BIN price active, include/exclude Half.com listings, include/exclude Amazon listings, sellers to target, sellers to exclude, include only top-rated sellers (TRS), include only listings where returns are accepted, specify 0, 1, or multiple conditions of listings to include. The search parameters may include anything that the marketplace provides as search filters.

Other available options include the ability to enable email notifications upon failure to revise, or when a floor price has been reached or a price suggestion becomes available. Notifications for price suggestions may be set, for example, for "never," "realtime," "hourly," or for a custom time once per day. Each of the options discussed above and set during initial setup of the PS software may be set or changed at a later time.

Once all user items or listing have been downloaded, the user can begin using the software of the present method.

Main Interface

The PS interface allows a user to adjust listings on an individual basis. The user can set an individual listing's BIN price, Floor Price, Ceiling Price, Algorithm, Algorithm Options, Search Parameters, managed/unmanaged, and automatic/manual pricing for each item separately, or for multiple items, preferably up to 25, 50, 100, or 200 items at a time. If a listing is an MVL (multi-variation listing) each variation (sub-listing) is presented along with the title of the main listing and the variation's SKU (if applicable), or with its variation keys/value pairs (ie Size: 7, Color: Black). The user can navigate to individual pages, search based on keywords in title/SKU, eBay category, or eBay store category, or search based on listing number. If a search is performed, all matches to that search are presented to the user. Items may preferably be sorted by listing number, managed/unmanaged, title, SKU, current price, BIN price, Ceiling Price, Floor Price, Algorithm, Start time, and End time.

If a user attempts to adjust the BIN Price, Ceiling Price, Floor Price, Algorithm, or Algorithm Options for one to four items at a time, the adjustments are processed immediately and any errors are displayed on the interface (if applicable). If the user attempts to adjust the BIN Price, Ceiling Price, Floor Price, Algorithm, or Algorithm Options for five or more listings, then the adjustments are added to a work queue to be processed later. An item is added to the work queue with the instruction "updatePrice" and marked as dirty in the database to prevent multiple updates.

If a user chooses "Set Search Options," the search console appears for the selected listing. The search console allows the user to set search parameters and perform searches based on those parameters. If the user clicks the "search" button, the user will see matching competing listings retrieved by the search, ordered by lowest total price (or lowest price if "Ignore Shipping" behavior is set). If the user has specified an algorithm to be used, they will also see the price that Price Spectre has determined according to the algorithm, which is then placed within the results. For example, if the price that would have been determined is lower than all other prices, it will be shown at the top above all listings. If the determined price is second, then it will be displayed between the first and second listings. If the determined price is higher than all listings retrieved by the search, then it will be displayed below all listings. If the user clicks the "save" button, the search parameters are saved. If the user clicks "save & close," the search parameters are saved and the search console is closed. The user can also close the search console without saving. PS uses the saved parameters to automatically reprice listings in automatic repricing mode, or to determine price suggestions for listings in manual repricing mode.

If the user selects the manual/automatic toggle, the listing is toggled between manual and automatic repricing. If the user selects the managed/unmanaged toggle, the listing will become managed if it was previously unmanaged, keywords or a product code have been specified, algorithm+options have been specified, and a floor price has been specified. When a listing becomes managed, Price Spectre will immediately set its price based on the settings chosen by the user. To set the price, PS performs a search on selected third party web sites, such as, for example, eBay, Half.com, and Amazon.com. The search is conducted based on the search parameters for the listing at issue. If the search fails, the process is aborted and a message is passed to the front end. The user sees the error message appear within the interface. Once the search results are collected, they are passed to a function that handles the algorithm specified by the user. The function returns the "Algorithm Price." If the listing is being automatically repriced, then the price is set according to the formula described below under "PRICE UPDATING, Managed." If the revision of the price fails for any reason, a message is passed to the front end and the user sees the error message appear in the interface. If the listing is being manually repriced and the price according to the formula below (see "PRICE UPDATING, Managed") is different from the listing's current price and currently suggested price, the new suggested price is recorded and the price recommendation is marked "unread." If the user's notification preferences indicate realtime notification for price recommendations, then the notification is sent to the message queue. Otherwise notification is handled by the price recommendation notifier at a later time.

If the listing was managed when the user selected the managed/unmanaged toggle, it will become unmanaged and have its price immediately updated such that "price"=max ("Floor Price", "BIN Price") if no "Ceiling Price" is specified. If a "Ceiling Price" is specified then price is updated such that "price"=max("Floor Price", min("BIN Price", "Ceiling Price")). PS will not update "price" if it is already satisfied by this formula.

The searches performed by PS are preferably performed on each applicable ecommerce site (eBay, Half.com, Amazon.com, and the like) using that site's own API. The search parameters are sent in the API call. The keywords parameter is parsed to determine whether it is a valid UPC, ISBN, EAN, eBay Product ID, or ASIN. If it is, then a "product" search is conducted on the ecommerce web site using the UPC, ISBN, EAN, eBay Product ID, or ASIN. In addition, a second search may be performed on other ecommerce sites, ignoring the redundant "product code" field. If the keywords are not determined to be a valid UPC, ISBN, EAN, eBay Product ID, or ASIN, then a keyword search is performed on the ecommerce site using the specified keywords. In addition, a second search may be performed on other ecommerce sites if the Product Code is set to a valid ISBN, UPC, EAN, eBay Product ID, or ASIN. If multiple searches were performed, their search results are merged and sent to the algorithm function.

When a listing is added to the PS database, it is determined the geographical identity of the ecommerce web site the listing belongs to. Searches are performed against the applicable site are also performed against other selected ecommerce sites in the same geographical region. Thus, searches performed with respect to an item listed on the eBay US site will also be performed on the Half.com and Amazon.com web sites, whereas searches performed with respect to an item listed on eBay Canada will also be performed on Amazon.ca, and the like.

Other Pages

A Shortcuts page is preferably provided, giving options to "Manage All" or "Disable All." If the user selects "Manage All," all listings that are unmanaged and have keywords or a product code specified, algorithm+options specified, and a floor price set become managed. If "Disable All" is selected, all listings become unmanaged. The instruction "updatePriceAll" is added to the work queue and all listings are marked as dirty in the database to prevent multiple updates.

A Billing tier page is preferably provided which allows the user to specify the maximum number of managed listings to allow. The user can also preferably make in-application purchases of refundable priority units to apply to particular listings. These priority units are used to increase the frequency of pricing updates.

A Notifications page is preferably provided to allow the user to specify notification preferences (as in the initial setup).

A Behaviors page is preferably provided to allow the user to specify PS behaviors (as in the initial setup).

A Defaults page is preferably provided to allow the user to specify default settings (as in the initial setup).

An Errors page is preferably provided that displays any listings that have had revision or search failures.

A History page is preferably provided that displays the price history of any specified listing via a chart or spreadsheet download. This page may also provide the sales and revenue history on the same chart.

An Export page is preferably provided that allows the user to download the settings of their current and recently ended listings by spreadsheet in, for example, CSV, XLS, or ODS formats.

An Import page is preferably provided that allows the user to upload settings for any of their current listings. Each row is treated as an instruction to apply those settings to all matching listings. Listings are matched based on the values in any specified "selector" columns. If a listing is modified due to the import it is added to the work queue with the instruction "updatePrice." Example 1, at the end of this disclosure, details an import function contemplated for use with the eBay family of web sites.

An Import Half.com page is preferably provided that allows the user to upload their latest Half.com Inventory Snapshot. If listings contained in the Inventory Snapshot were not previously listed in PS they are added to the database. If listings were already contained in the database, their entries are updated to reflect their current status. If listings are active in the database but not present in the Inventory Snapshot they are marked as ended in the database. Because the Half.com web site does not provide an explicit method for relisting an item, PS assumes that a Half.com listing is a relist if, in the PS database, there exists a Half.com item listing marked as ended that has the same product code (such as UPC, ISBN, or EAN), and has the same condition. PS then treats the relist the same as relists on other ecommerce web sites (such as, for example eBay), as described below.

A Price Suggest page is preferably provided, which brings up the search console for every managed listing that is manually repriced and has pending price recommendations available. The search console is preferably embedded into the page and the user is given the option of changing search parameters, setting the price to the amount suggested by the search console (this can be manually changed), approving the price recommendation, denying the price recommendation leaving the price as-is, or skipping for the moment in order to make a determination later.

An algorithms page is preferably provided that simply lists and describes the algorithms available to the user.

Back End

A primary component of the PS backend is the scheduler. One exemplary embodiment of an implementation of the schedule is depicted in the flow chart provided in FIG. 1, and is now described. In this exemplary embodiment, when a listing is added to Price Spectre the listing is assigned a random index based on the update frequency for that listing, as shown in box 10 of FIG. 1. For example, listings on a two hour update cycle are given an index from 0-119, representing the minute the scheduler is active for that listing. Listings on a fifteen minute cycle are assigned an index from 0-14, and so on.

Each minute one instance per possible update frequency of the scheduler is launched via a cronjob. Active, managed listings are fetched for each instance based on matching frequency and matching index to the minute, as represented by box 12 of FIG. 1. For example, if a listing is on a one-hundred twenty minute cycle and has index of thirty it is handled by the scheduler instance representing one-hundred twenty minute cycle listings that launched at 00:30, 02:30, 04:30, . . . , 22:30. Another example is a listing with an index of three and a fifteen minute frequency. This listing is handled by the scheduler instance representing fifteen minute cycles launched at minutes 03, 18, 33, and 48 of every hour.

Once the listings are fetched by the appropriate scheduler, the scheduler forks into several concurrent processes with each one assigned to a single listing. This forking is represented in FIG. 1 by box 14. Each process performs a search on selected third-party ecommerce web sites, such as, for example, eBay, Half.com, and Amazon.com, based on that listing's search parameters. This step in the method is represented by box 16 of FIG. 1, as well as the other, unlabeled boxes stemming from box 14. Box 18 of FIG. 1 represents a decision point, where the method determines whether the search represented in box 16 has failed. If the search fails the process is aborted and a message indicating the error is added to the message queue, as represented by box 28 of FIG. 1. Otherwise, filters are applied based on search parameters not handled by the ecommerce site, as represented by box 20, and results from all searches are merged and sorted according to price, as represented by box 22. Next, the collected results are passed to a function that handles the specified algorithm, as represented by box 24. The function returns the "Algorithm Price." If the listing is being automatically repriced, then the price is then set according to the formula below under the heading "PRICE UPDATING, Managed," as represented by box 26. Box 30 represents a decision point to determine whether the price revision has succeeded. If the revision of the price fails for any reason, a message is stored in the message queue indicating the error, as represented by box 28. If the listing is being manually repriced, and the price according to the formula below (see "PRICE UPDATING, Managed") is different than the listing's current price and currently suggested price, then the new suggested price is recorded and the price recommendation is marked "unread." If the user's notification preferences indicate realtime notification for price recommendations then the notification is sent to the message queue. Otherwise notification is handled by the price recommendation notifier at a later time. The scheduler then waits for all processes to finish, as represented by box 32, then comes to an end as represented by box 34.

Another important component of the back end is the platform notifications listener. The listener receives messages from a third-party ecommerce site, such as eBay, when an event occurs pertaining to a particular user. For PS this is preferably done with a combination of email (the message), a procmail filter, and a php script (listener) to process the email. The listener first determines which type of message has been received and then calls a specific function to handle that type.

If the message is type "ItemListed," PS determines whether the listing is a fixed price listing or not. If it is not a fixed price listing, then the listener ignores the message. Otherwise the listing is added to the database. PS determines whether the item is a relist by checking all recently ended items that have the same title. In the situations where the "Relaxed Relist" feature of the present method is turned off, PS will determine whether eBay, for example, reveals one of those listings as the original listing. If so, PS will import all settings, price history, sales history, and revenue history from that original listing. If the item is not a relist then all settings except "BIN Price" are set according to the user's default. If the listing is not a relist then the item is added to the work queue with the instruction "updateCatalogInfo." If the listing is not a relist and uses calculated shipping then the listing is added to the work queue with the instruction "updateShippingInfo." "BIN Price" is set to the current price of the listing.

If the message is type "ItemRevised" then PS determines whether the listing is a fixed price listing or not. If it is not a fixed price listing, then the listener ignores the message. Otherwise the listing's information (price, title, end time, and the like) is updated in the database. If the item is an MVL (multi-variation listing) then each variation (sub-listing) is adjusted accordingly. Also, since variations can be added or removed this is checked and handled by either marking the variations ended or adding new ones to the database and adjusting settings as in the "ItemListed" call. If the listing transitions from flat rate shipping to calculated shipping then the listing is added to the work queue with the instruction "updateShippingInfo." If the listing uses calculated shipping and shipping information changes (for example, the listing transitions from free to paid shipping, from paid to free shipping, the listing's handling fee changes, or the like) the listing is added to the work queue with the instruction "updateShippingInfo."

If the message is type "FixedPriceTransaction" then PS determines whether the transaction has already been processed. If it has already been processed, then the message is ignored. If it has not yet been processed then the transaction is added to the database and the listing's sales history and revenue history are updated. If available quantity is 0 then the listing is marked as ended in the database.

If the message is type "ItemSuspended," "ItemSold," "ItemUnsold," or "EndOfAuction" then the item is marked as ended in the database.

If the message is type "TokenRevocation," the authorization token is removed from the database and the user is unsubscribed.

Another important component of the back end is the work queue. The work queue includes of a set of instructions to be performed. Current instructions include the following:

getSellerItems—downloads all items from a third-party ecommerce web site, such as eBay, for a particular user, and adds them to the database.

updatePrice—updates the price of a listing based on the formulas specified below under the header "PRICE UPDATING, Managed" or "PRICE UPDATING, Unmanaged" and removes the "dirty" marking from the listing in the database. If the revision of price fails for any reason a message is stored in the message queue indicating the error.

updatePriceAll—updates the price for all listings for a particular user based on the formulas specified under "PRICE UPDATING, Managed" or "PRICE UPDATING, Unmanaged" and removes the "dirty" marking from the listings for that user in the database. For each listing, if the revision of price fails for any reason a message is stored in the message queue indicating the error.

updateCatalogInfo—fetches the catalog information or part numbers from the listing, if they exist, and automatically sets the search parameter's product code or keywords. When a listing is retrieved from eBay, for example, and if there is a UPC Code, ISBN, EAN, Product ID, or Manufacturer Part Number, it is retrieved from the listing and PS sets the keywords or product code based on that information.

updateShippingInfo—determines postage costs based on the location of the item. In one exemplary method of determining postage costs, PS applies a shipping calculator using the item's dimensions, weight, and origin as specified on the ecommerce site (for example, eBay). The shipping destination used by PS is the same as the origin, which provides the minimum possible shipping costs. The destination can be configured by the user to reflect any desired postal code.

The work queue is preferably checked for new items every five minutes via a cronjob. When new items are found several instructions are pulled from the queue at once and processed simultaneously. This is accomplished by forking into several processes where each process handles one new instruction. When each new instruction is completed it is marked as finished and removed from the queue.

Another component of the backend interprets emails sent by eBay's File Exchange to automatically download Half-.com Inventory Snapshots. Price Spectre parses the username and jobId from the email and then downloads the Inventory Snapshot from Half.com. The user can provide Inventory Snapshots by simply adding a specific email address to the address field on Half.com. This email address is monitored by PS utilizing, for example, a procmail filter and a php script to process the email. The user can also automate these functions to have Half.com send them to Price Spectre automatically once per day. These snapshots are then processed exactly as if the user uploaded them from the "Import Half.com" page.

Still another component of the back end is the message queue. This is provided to prevent spamming hundreds or thousands of failure notifications to a user in certain circumstances. The message queue is inspected for new messages every five minutes via a cronjob. When new messages are found, all messages intended for the same recipient are tied together into a single email and sent to the recipient. This process is repeated for each recipient in the queue. Once a message is sent it is marked as "finished" and removed from the queue.

Another component of the back end is the price recommendation notifier. Each hour the notifier is launched and determines whether any listings have new price recommendations made within the last hour for users who have their notification preferences set to once per hour. If any exist, a single message is sent to each user indicating the price recommendations that are available for their listings.

Every five minutes the notifier is launched and determines whether any listings have new price recommendations made within the last day for sellers who have their notification preferences set to once per day, and indicated the time the notifier launched as the time to send notifications. If any exist, a single message is sent to each user indicating the price recommendations that are available for their listings.

Algorithms

The following exemplary algorithms are provided for use in conjunction with the present method:

1) Lowest—Takes no parameters. "Algorithm Price" is set to the lowest price found minus 0.01.

2) X Lowest—Takes one unsigned integer parameter X, where X is greater than zero. "Algorithm Price" is set to the Xth lowest price found minus 0.01. If the number of listings, N, returned by the search is less than X, then "Algorithm Price" is set to the Nth lowest price minus 0.01.

3) Average 3—Takes no parameters. "Algorithm Price" is set to average price of the 3 lowest prices found. If the number of listings, N, returned by the search is less than 3, then "Algorithm Price" is set to the average price of the Nth lowest prices.

4) Average X—Takes one unsigned integer parameter X, where X is greater than zero. "Algorithm Price" is set to average price of the X lowest prices found. If the number of listings, N, returned by the search is less than X, then "Algorithm Price" is set to the average price of the Nth lowest prices.

Figure 2:
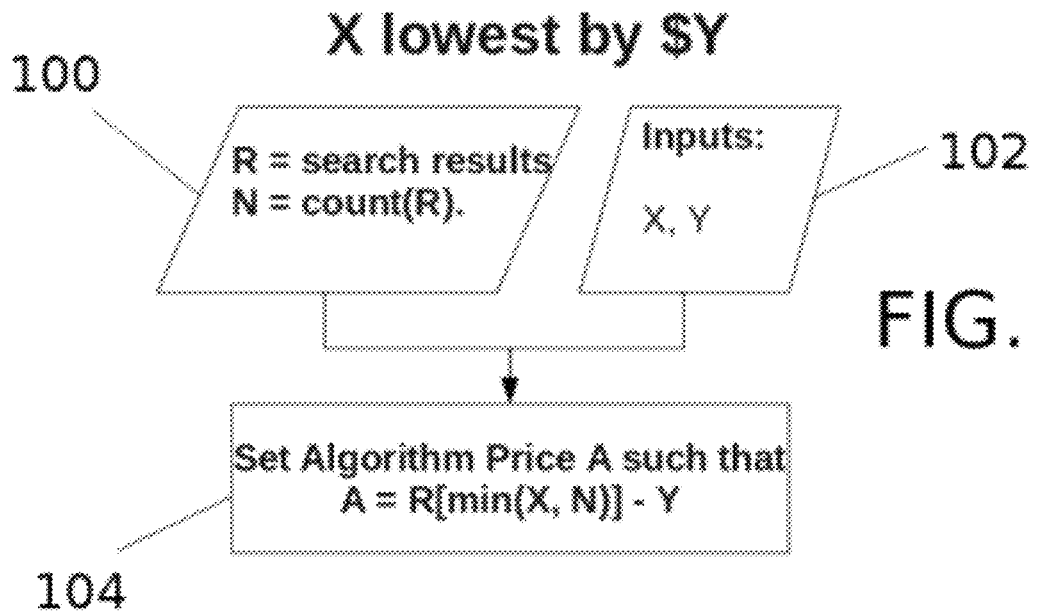
FIG. 2 is a flow chart depicting an "X lowest by $Y algorithm of the present invention.

5) X lowest by $Y—This algorithm is represented by the flow chart provided in FIG. 2. As represented by box 100, the algorithm utilizes search results, R, and sets N=count(R). The algorithm also utilizes one unsigned integer parameter X and one signed floating point parameter Y, where X is greater than zero, as represented by box 102. "Algorithm Price" is set to the Xth lowest price found minus Y (or, algorithm price=R[min(X,N)]−Y, as represented in box 104). A negative Y results in charging −Y more than the Xth lowest price. If the number of listings, N, returned by the search is less than X, then "Algorithm Price" is set to the Nth lowest price found minus Y.

Figure 3:
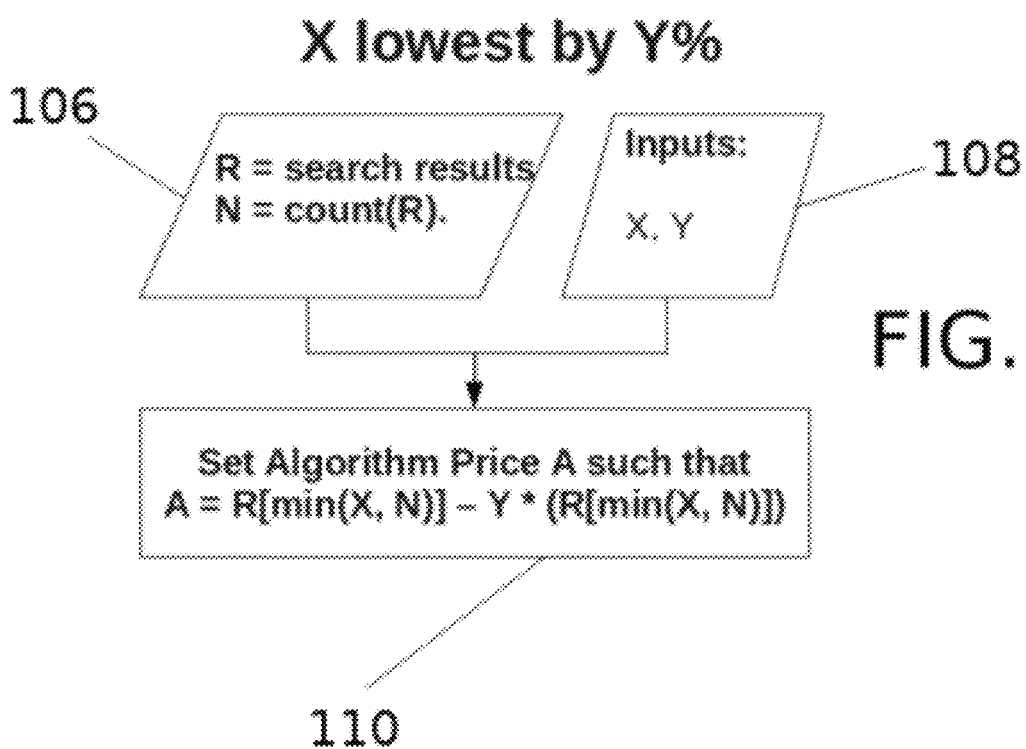
FIG. 3 is a flow chart depicting an "X lowest by Y %" algorithm of the present invention.

6) X lowest by Y %—This algorithm is represented by the flow chart provided in FIG. 3. As represented by box 106, the algorithm utilizes search results, R, and sets N=count(R). The algorithm also utilizes one unsigned integer parameter X and one signed floating point parameter Y, where X is greater than zero, as represented by box 108. "Algorithm Price" is set to the Xth lowest price found minus Y % (or the algorithm price=R[min(X,N)]−Y*(R[min(X,N)]), as represented by box 110). A negative Y results in charging −Y % more than the Xth lowest price. If the number of listings, N, returned by the search is less than X, then "Algorithm Price" is set to the Nth lowest price minus Y %.

Figure 4:
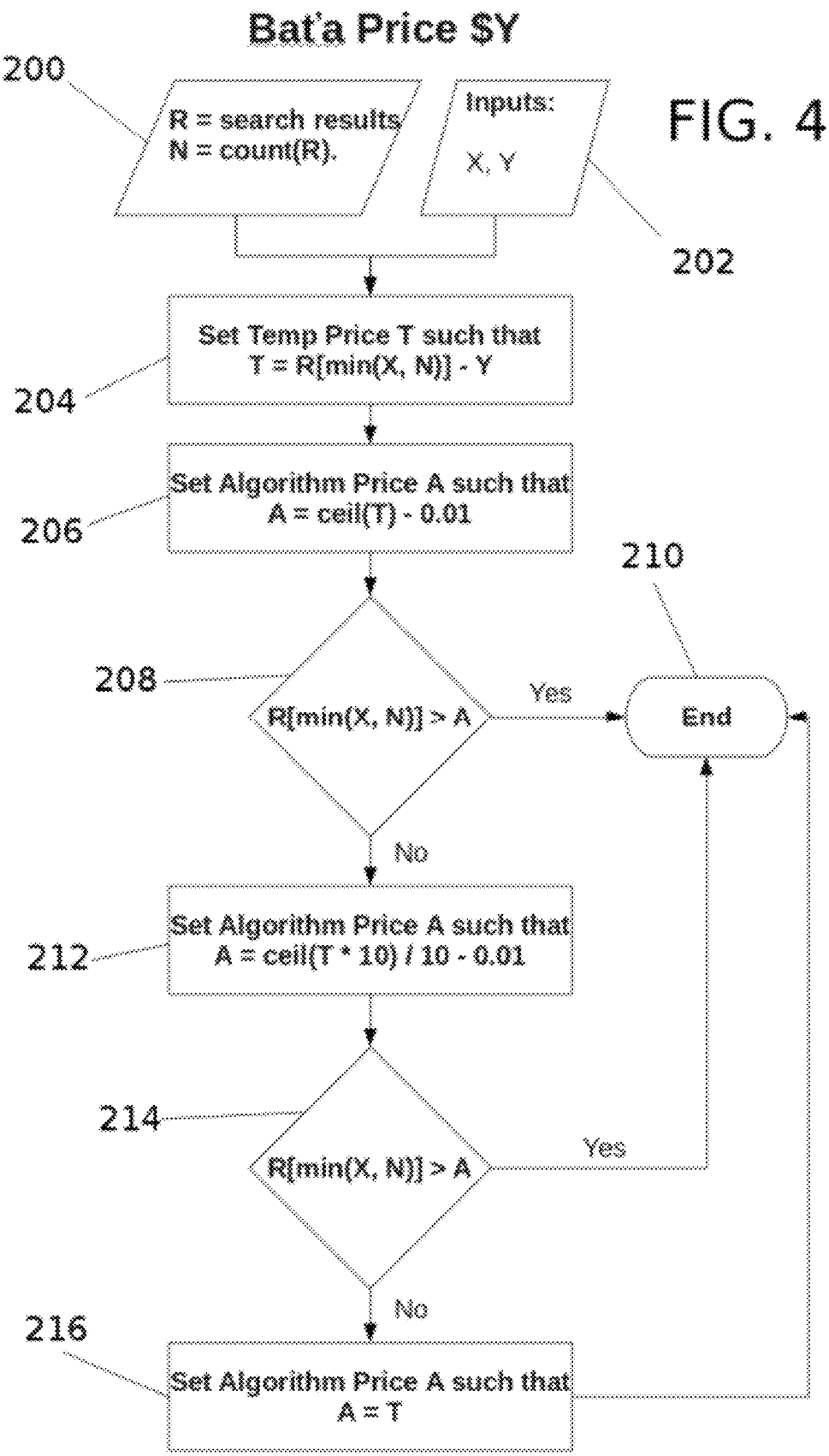
FIG. 4 is a flow chart depicting a "Bata Price $Y" algorithm of the present invention.

7) Bata Price $Y—This algorithm is presented in the flow chart included in FIG. 4. As represented by box 200, the algorithm utilizes search results, R, and sets N=count(R). The algorithm also utilizes one unsigned integer parameter X and one signed floating point parameter Y, where X is greater than zero, a represented by box 202. "Algorithm Price" is set the same as "X lowest by $Y" but, if possible, increased so that the price ends in 0.99 (this can preferably be configured to end in 0.97, 0.95, or anything else). If rounding up to 0.99 makes the price higher than the Xth lowest price, then rounding up to 0.#9 is attempted (where 0.#9 is 0.89, 0.79., 0.69, etc., through 0.09). If rounding up to 0.#9 makes the price higher than the Xth lowest price, then the algorithm price is the same as "X lowest by $Y," above. This is to take advantage of psychological pricing. To accomplish this, a Temp Price, T, is first set such that T=R[min(X,N)]−Y, as represented by box 204. An algorithm price, A, is then set such that A=ceiling (T)−0.01, as represented by box 206. Box 208 represents a decision point wherein it is determined whether R[min(X,N)] is greater than the algorithm price, A. If it is, then the algorithm comes to an end, as represented by box 210. If not, then the algorithm price, A, is set such that A=ceiling(T*10)/10−0.01, as represented by box 212. Again a decision point is reached, box 214, wherein it is determined whether R[min(X, N)] is greater than the algorithm price, A. If it is, then the algorithm comes to an end (box 210). Otherwise, the algorithm price, A, is set such that A=T (box 216), and the algorithm comes to an end (box 210).

Example 1

Bata Price $Y

In the situation where X=1 and Y=$1.50, and where the lowest price found is $44.98, the calculated price is $43.99. This is determined by $44.98−$1.50=$43.48. This value is then rounded up to $43.99

Example 2

Bata Price $Y

In the situation where X=1 and Y=$0.10, and where the lowest price found is $44.98, the calculated price is $44.89. This is determined by $44.98−$0.10=$44.88, and then rounding up to $44.99. The price $44.99 is, however, higher than the lowest price, so the price is dropped to $44.89.

Example 3

Bata Price $Y

In the situation where X=1 and Y=$0.25, and the lowest price found is $44.98, the calculated price is $44.79. This is determined by $44.98−$0.25=$44.73, and then rounding up to $44.99. The price $44.99 is, however, higher than the lowest price, so the price is dropped to $44.79.

Figure 5:
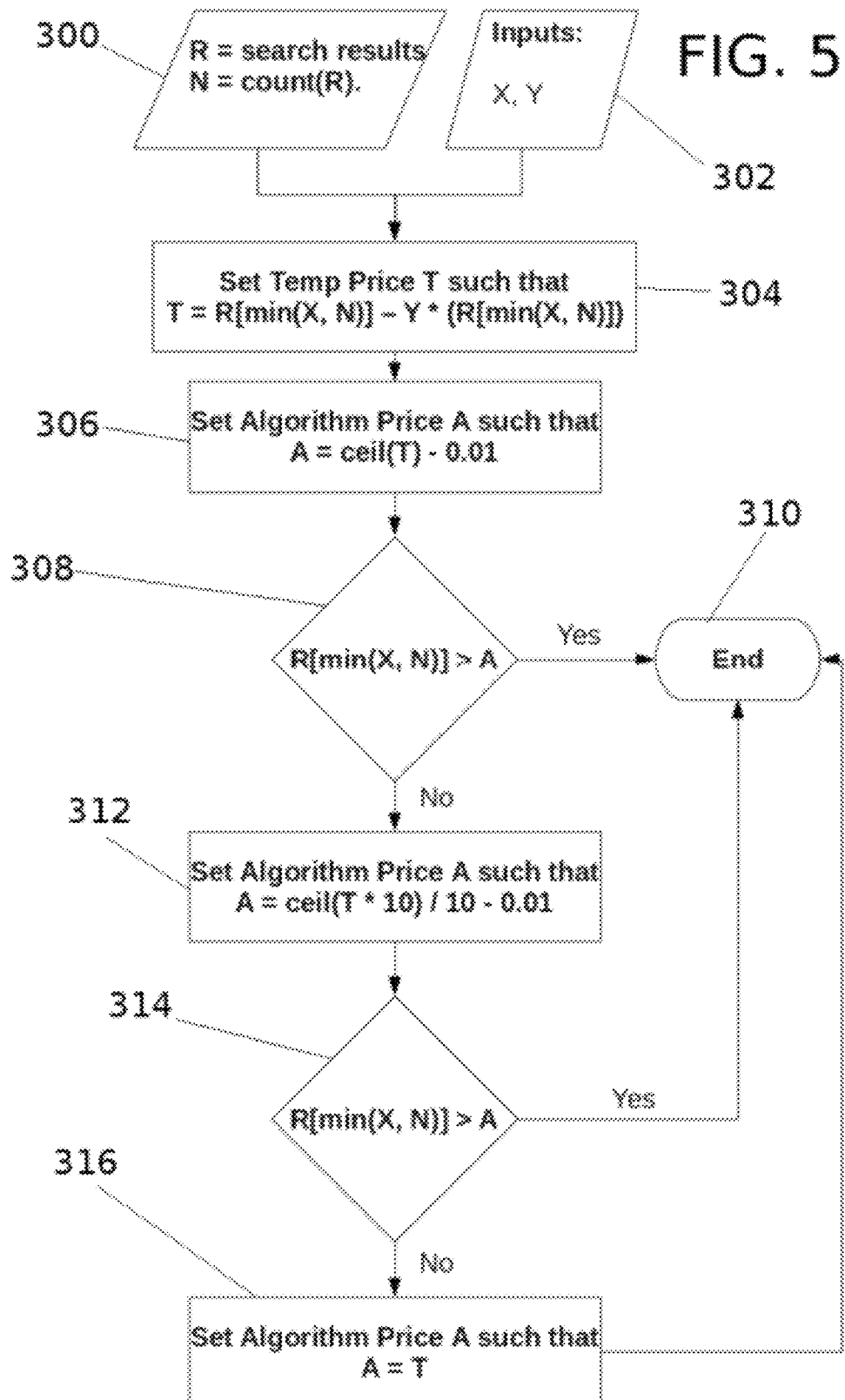
FIG. 5 is a flow chart depicting a "Bata Price Y %" algorithm of the present invention.

8) Bata Price Y %—This algorithm is represented by the flow chart provided in FIG. 5. The algorithm utilizes search results, R, and sets N=count(R), as represented by box 300. The algorithm also utilizes one unsigned integer parameter X and one signed floating point parameter Y, where X is greater than zero (box 302). "Algorithm Price" is set the same as "X lowest by Y %" but, if possible, increased so that the price ends in 0.99 (this can preferably be configured to end in 0.97, 0.95, or anything else). If rounding up to 0.99 makes the price higher than the Xth lowest price, then rounding up to 0.#9 is attempted (where 0.#9 is 0.89, 0.79, 0.69, etc., through 0.09). If rounding up to 0.#9 makes the price higher than the Xth lowest price, then the algorithm price is the same as "X lowest by Y %," above. This is to take advantage of psychological pricing. To accomplish this, a Temp Price, T, is set such that T=R[min(X,N)]−Y*(R[min(X,N)]), as represented by box 304. The algorithm price, A, is set such that A=ceiling(T)=0.01 (box 306). Box 308 represents a decision point where it is determined whether R[min(X,N)] is greater than the algorithm price, A. If it is, the algorithm comes to an end (box 310). If it is not, the algorithm price, A, is set such that A=ceiling(T*10)/10−0.01 (box 312). Another decision point is reached (box 314) to determine whether R[min(X,N)] is now greater than the algorithm price, A. If it is, then the algorithm ends (box 310). If it is not, then the algorithm price, A, is set such that A=T (box 316).

Figure 6:
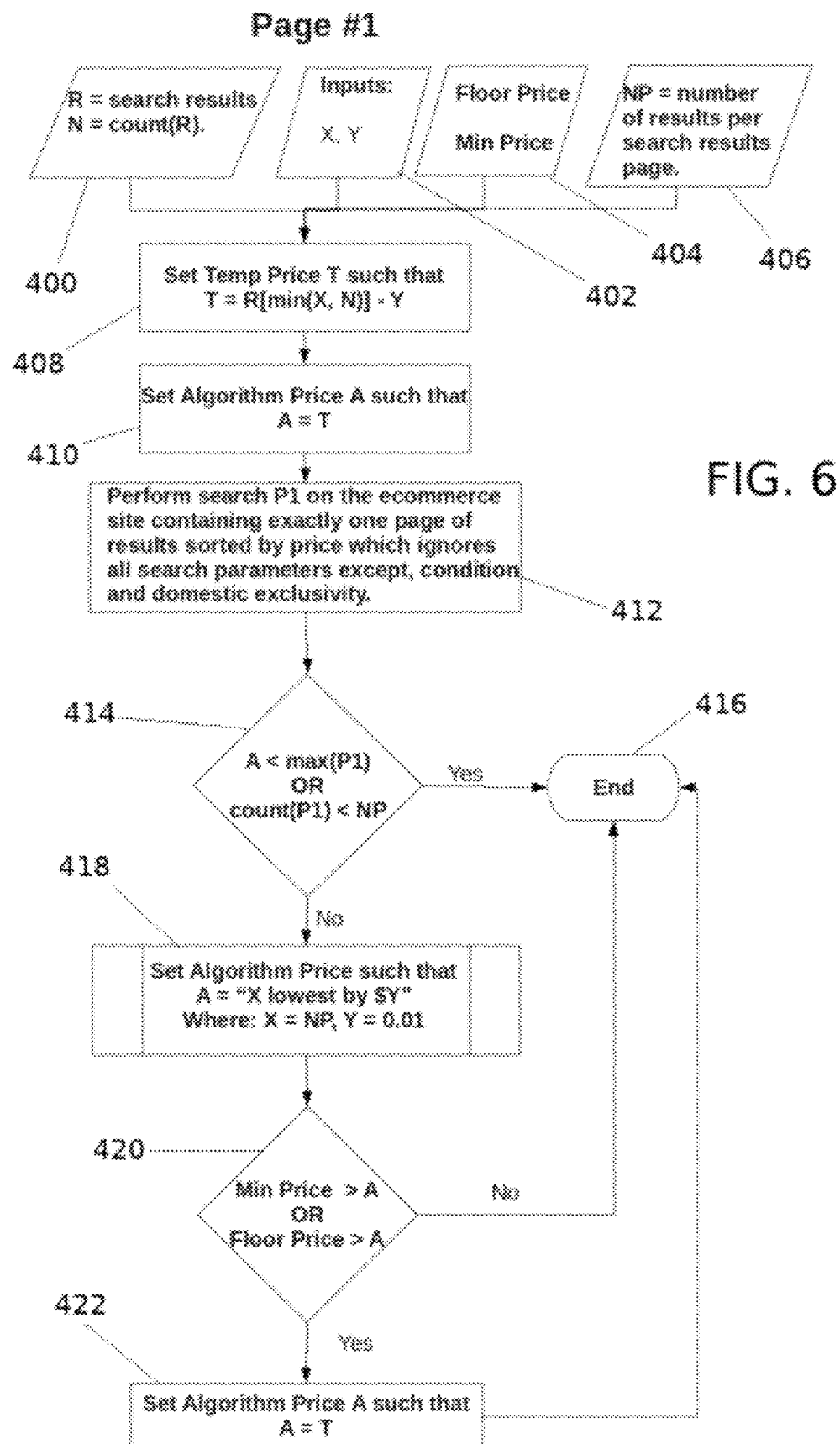
FIG. 6 is a flow chart depicting a "Page #1" algorithm of the present invention.

9) Page #1—This algorithm is represented by the flow chart provided in FIG. 6. The algorithm utilizes search results, R, and sets N=count(R), as represented by box 400. The algorithm further utilized one unsigned integer parameter X and one signed floating point parameter Y (box 402), a Floor Price and Min. Price (box 404), and the number of results per search results page, NP (box 406). "Algorithm Price" is first calculated by applying the rules of "X lowest by $Y." PS then performs a search of a third-party ecommerce site, such as eBay, ignoring all specified search parameters except "conditions" and "include domestic only" and including both auctions with a BIN price and fixed price listings. If the "Algorithm Price" would not result in being placed within the twenty-five lowest priced listings (in other words not on page #1) then the "Algorithm Price" is set according to the algorithm "X lowest by $Y" where X=25 and Y=0.01. If the resulting price determined by "PRICE UPDATING, Managed," below, still would not result in the listing appearing on page #1 (most likely due to floor price being set too high) or would price the listing below the optional "Minimum Price" specified in the "Search Parameters," then the Algorithm Price is set based on the original "X lowest by $Y" computation.

Looking to FIG. 6, the Page #1 algorithm takes the inputs, above, and then sets a Temp Price T such that T=R[min(X, N)]−Y (box 408). An algorithm price, A, is set such that A=T (box 410). The algorithm performs search P1 on the pertinent ecommerce site, containing one page of results sorted by price, and ignores all search parameters except condition and domestic exclusivity (box 412). Box 414 represents a decision point wherein it is determined whether the algorithm price, A, is less than max(P1) or whether count(P1) is less than NP. If either of these is true, the algorithm ends (box 416). If neither is true, the algorithm price, A, is set such that A="X lowest by $Y" (see above) where X=NP and Y=0.01 (box 418). Again a decision point is reached wherein it is determined whether Min. Price is greater than the algorithm price, A, or whether the Floor Price is greater than the algorithm price, A. If neither of these is true, then the algorithm ends (box 416). If either one of these is true, then the algorithm price is set such that A=T (box 422) and then the algorithm ends (416).

Price Updating

Managed

When PS updates a price it is updated such that "price"=max("Floor Price", "Algorithm Price") if no "Ceiling Price" is specified. If a "Ceiling Price" is specified then price is updated such that "price"=max("Floor Price", min ("Algorithm Price", "Ceiling Price")). If no competition is found then "Algorithm Price" is replaced by the value of "BIN Price," "Floor Price," or "Ceiling Price" depending on "Behavior" settings. PS will not update "price" if it is already satisfied by this formula.

Unmanaged

When PS updates a price it is updated such that "price"=max("Floor Price", min("Algorithm Price", "Ceiling Price")) if both a "Ceiling Price" and "Floor Price" are specified. If no "Ceiling Price" is specified then price is updated such that "price"=max("Floor Price", "BIN Price"). If no "Floor Price" is specified then price is updated such that "price"=min("Ceiling Price", "BIN Price"). If neither "Floor Price" or "Ceiling Price" is specified then price is updated such that "price"="BIN Price." If "BIN Price" is not specified then PS does not update the price. PS will not update "price" if it is already satisfied by these formulas.

Example 1

Import/Bulk Settings Upload on eBay

The bulk uploading of listing settings provides a user of the present method with a way to create settings offline and then upload them later. This also provides an easy mechanism by which the user can perform simple commands (such as enable all, disable all, and the like), as well as break up settings by category or site ID. Imported files include a header row and one or more other rows having a series of commands to perform. Each of these other rows includes one or more selectors, and one or more customizable properties.

Selectors include item number (the listing number assigned by eBay), SKU (the SKU or variation, if an MVL, that identified one or more listings, site (the eBay site a listing belongs to), and category (the category a listing belongs to). PS combines all of the specified selectors with the logical AND operator to find matching listings. Customizable properties include any setting normally set via the PS interface or search console. Read-only properties, such as current price and title, are ignored by PS when processing the input file. Each row in the input file is considered a separate command, and each command is processed in the order in which it appears in the in the file. A single command can reference one or more listings.

During the import/bulk settings upload process, PS treats columns differently depending on whether they are numeric or text columns. With respect to numeric columns, a blank cell is ignored by PS. Not specifying a particular column has the same effect as leaving all cells of that column blank. A zero is used as a clearing value, which removes a particular setting set as zero. For example, setting the Ceiling Price to zero removes the ceiling price from PS to that it will no longer limit a listing's price to an upper value.

Text columns include the properties "Include Sellers," "Exclude Sellers," and "Keywords." "Include Sellers" and "Exclude Sellers" may include a comma-separated list of sellers. Leaving a cell blank clears that particular property. For example, leaving "Exclude Sellers" blank results in no sellers being excluded from PS. To avoid setting these properties, a user must not specify the respective columns in the input file.

Figures 7, 8:
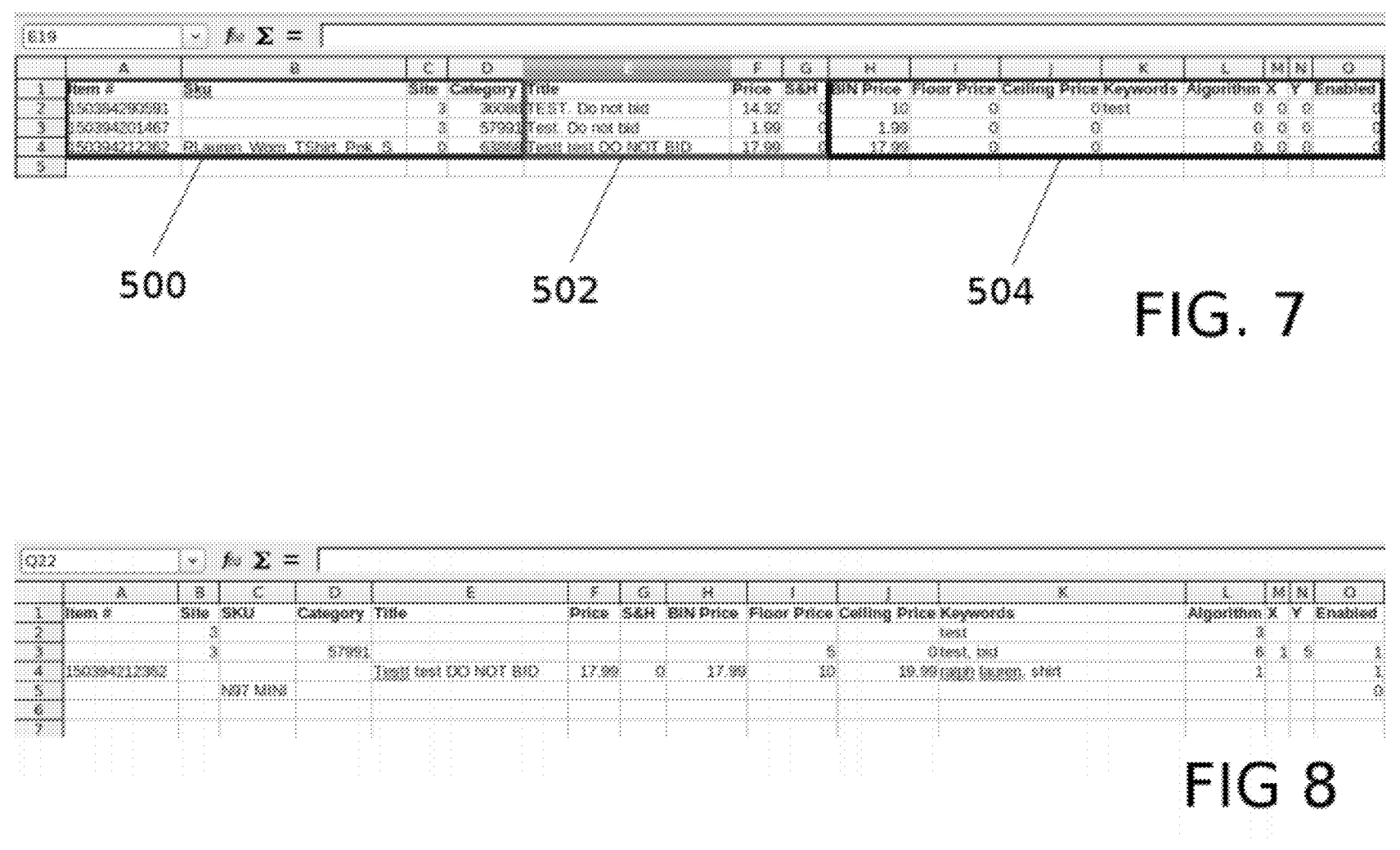

Parts of an exemplary command are provided in FIG. 7. As shown in the figure, the command includes selectors 500, read-only properties 502, and customizable properties 504. Which respect to FIG. 7, the first command tells PS to set listing 150384290591 on Site 3 (eBay.co.uk) and Category 36086 ("Other Manuals and Literature") to a BIN price of £10.00, and changes the search keywords to "test." The command also clears the values for Floor Price, Ceiling Price, Algorithm, X, and Y, and tells PS to stop managing the listing. Because the listing is uniquely identified by the listing number, the remaining selectors (SKU, Site, and Category) can be left blank to achieve the same result.

The second command shown in FIG. 7 is similar to the first command, except that it sets a different listing to a BIN price of £1.99.

The third command shown in FIG. 7 involves a multi-variation listing (MVL). In order to uniquely identify this item, a SKU must also be provided. This command also behaves similarly to the first two commands and sets the BIN price to $17.99 on Site 0 (eBay.com).

FIG. 8 provides a sample input of four commands. The first command tells PS to set the pricing algorithm of all listings one Site 3 to "Average 3," and to set the Keyword for these listings to "test."

The second command in FIG. 8 tells PS to set all listings on Site 3 in Category 57991 ("Formal Shirts") to Keywords "test, bid," and to set the pricing algorithm for these listings to "x lowest y %" with X set to 1 and Y set to 5%. This command also tells PS to set the floor price for these listings to £5.00, and tells PS to manage the listings and not to use a ceiling price.

The third command in FIG. 8 involves an MVL. Since only the listing number is specified, all variants will be affected. This command sets the BIN price to $17.99, the floor price to $10.00, the ceiling price to $19.99, and Keywords to "ralph lauren, shirt." The command also sets the pricing algorithm to "lowest" for all variants of listing 150394212362. The command also instructs PS to manage all variants of the listing.

The fourth command in FIG. 8 disables all listings with SKU "N97 MINI" and removes the keywords used for searching.

The description above provides an exemplary implementation of the present method. It is contemplated that one of skill in the art will envision certain modifications and variations on the above upon reading this disclosure, and such modifications and variations are considered to be within the scope of the present invention. Specific instruction names or field names provided above may be varied according to the need or desire of a user of the present method without departing from the spirit or scope of the present invention.

Having thus described the preferred embodiment of the invention, what is claimed as new and desired to be protected by Letters Patent includes the following:

1. A computer-implemented method for managing listing prices in an ecommerce environment, the method comprising the steps of:

a) receiving from a user information, including price information, pertaining to a listing of the user on an ecommerce web site;

b) receiving from the user at least one search term that is not a valid UPC, ISBN EAN, eBay Product ID, or ASIN;

c) searching at least one ecommerce web site using the at least one search term received from the user in step b), above, and retrieving from the ecommerce web site at least one item listing relevant to the at least one search term; and d) repricing the user's listing such that the price of the at least one item retrieved from the ecommerce web site in step c), above, is utilized to determine a new price for the user's listing, wherein said computer-implemented method is performed by at least one computer programmed to perform steps a) through d), above, and further wherein the user's listing is repriced by setting a price A to the Xth lowest price found minus Y, wherein X is an unsigned integer parameter and Y is a floating point parameter, and further wherein X and Y are supplied by a user of the present method repricing an item; adjusting the price A such that the price A ends in the greater of .99 or .#9, where # is a least significant digit of the price of the listing before repricing, while remaining lower than the Xth lowest priced item retrieved in step c), above; and repricing the user's listing such that the price of the user's listing equals the price A.

2. A computer-implemented method for managing listing prices in an ecommerce environment, the method comprising the steps of:

a) receiving from a user information, including price information, pertaining to a listing of the user on an ecommerce web site;

b) receiving from the user at least one search term that is not a valid UPC, ISBN, EAN, eBay Product ID, or ASIN;

c) searching at least one ecommerce web site using the at least one search term received from the user in step b), above, and retrieving from the ecommerce web site at least one item listing relevant to the at least one search term; and d) repricing the user's listing such that the price of the at least one item retrieved from the ecommerce web site in step c), above, is utilized to determine a new price for the user's listing, wherein said computer-implemented method is performed by at least one computer programmed to perform steps a) through d), above, and further wherein the user's listing is repriced in step d), above, by e) setting a price A to the Xth lowest price found minus Y, wherein X is an unsigned integer parameter and Y is a floating point parameter, and further wherein X and Y are supplied by a user of the present method of repricing an item;

f) retrieving from the ecommerce web site at least a first page of the lowest priced items related to the listed item being repriced;

g) determining whether price A will result in the item being repriced appearing on the first page of lowest priced items retrieved from the ecommerce web site in step f), above;

h) if the result of step g, above, is that the price A would not result in the item being repriced appearing on the first page of the lowest priced items retrieved from the ecommerce web site, resetting price A to the Xth lowest price found minus Y, wherein X is 25 and Y is 0.01, and determining whether the reset price A will result in an item being repriced appearing on the first page of the lowest priced items retrieved from the ecommerce web site in step f), above;

i) if the result of step g), above, is that the price A will result in the item being repriced appearing on the first page of the lowest priced items retrieved from the ecommerce web site, repricing the item being repriced such that the price of the item being repriced equals the price A and ending the method;

j) if the result in step h), above, is that the price A will result in the item being repriced appearing on the first page of lowest priced items retrieved from the ecommerce web site, repricing the item being repriced such that the price of the item being repriced equals the price A and ending the method; and k) if neither step g) nor step h), above, result in the item being repriced appearing on the first page of the lowest priced items retrieved from the ecommerce web site, resetting the price A to the value of price A set in step e), above, and repricing the item being repriced such that the price of the item being repriced equals the price A and ending the method.

3. A computer-implemented method for repricing an item listed on an ecommerce web site, the method comprising the steps of:

a) searching an ecommerce web site for items pertaining to a listed item to be repriced;

b) retrieving from the ecommerce web site at least one item listing search result pursuant to the search in step a), above;

c) setting a price A to the Xth lowest price found minus Y, wherein X is an unsigned integer parameter and Y is a floating point parameter, and further wherein X and Y are supplied by a user of the present method repricing an item;

d) adjusting the price A such that the price A ends in the greater of 0.99, or 0.#9, where # is a second least significant digit of the price of the listing before repricing, while remaining lower than the Xth lowest priced item retrieved in step c), above, wherein said computer-implemented method is performed by at least one computer programmed to perform steps a) through d), above.

4. A computer-implemented method for repricing an item listed on an ecommerce web site, the method comprising the steps of:

a) searching an ecommerce web site for items pertaining to a listed item to be repriced;

b) retrieving from the ecommerce web site at least one item listing result pursuant to the search in step a), above;

c) setting a price A to the Xth lowest price found minus Y, wherein X is an unsigned integer parameter and Y is a floating point parameter, and further wherein X and Y are supplied by a user of the present method repricing an item;

d) retrieving from the ecommerce web site at least a first page of lowest priced items related to the listed item being repriced;

e) determining whether price A will result in the item being repriced appearing on the first page of lowest priced items retrieved from the ecommerce web site in step d), above;

f) if the result of step e), above is that price A would not result in the item being repriced appearing on the first page of lowest priced items retrieved from the ecommerce web site, resetting price A to the Xth lowest price found minus Y, wherein X is 25 and Y is 0.01, and determining whether the reset price A will result in the item being repriced appearing on the first page of lowest priced items retrieved from the ecommerce web site in step d), above;

g) if the result of step e), above, is that the price A will result in the item being repriced appearing on the first page of the lowest priced items retrieved from the ecommerce web site, repricing the item being repriced such that the price of the item being repriced equals the price A and ending the method;

h) if the result of step f), above, is that price A will result in the item being repriced appearing on the first page of the lowest priced items retrieved from the ecommerce web site, repricing the item being repriced such that the price of the item being repriced equals price A and ending the method; and i) if neither step e) nor step f), above, result in the item being repriced appearing on the first page of the lowest priced items retrieved from the ecommerce web site, resetting the price A to the value of price A set in step c), above, and repricing the item being repriced such that the price of the item being repriced equals the price A and ending the method, wherein said computer-implemented method is performed by at least one computer programmed to perform steps a) through i), above.

* * * * *